United States Patent
Blendea et al.

(10) Patent No.: US 6,631,951 B2
(45) Date of Patent: Oct. 14, 2003

(54) POWERED ACTUATOR FOR LUMBAR UNIT

(75) Inventors: Horia Blendea, Lasalle (CA); Jintao Liu, Windsor (CA); Yang Cao, Windsor (CA); Ed Dornan, Ypsilanti, MI (US); Joseph Benson, South Lyon, MI (US)

(73) Assignee: Schukra of North America, Windsor (CA)

( * ) Notice: Subject to any disclaimer, the term of this patent is extended or adjusted under 35 U.S.C. 154(b) by 0 days.

(21) Appl. No.: 09/855,330

(22) Filed: May 15, 2001

(65) Prior Publication Data
US 2002/0113472 A1 Aug. 22, 2002

Related U.S. Application Data

(63) Continuation-in-part of application No. 09/790,003, filed on Feb. 21, 2001.

(51) Int. Cl.$^7$ ............................................... A47C 3/025
(52) U.S. Cl. ................................................... 297/284.4
(58) Field of Search ........................... 297/284.1, 284.4

(56) References Cited

U.S. PATENT DOCUMENTS

| | | | |
|---|---|---|---|
| 4,153,293 A | 5/1979 | Sheldon ........................ 297/284 |
| 4,295,681 A | 10/1981 | Gregory ....................... 297/284 |
| 4,313,637 A | 2/1982 | Barley ......................... 297/284 |
| 4,316,631 A | 2/1982 | Lenz et al. .................... 297/284 |
| 4,449,751 A | 5/1984 | Murphy et al. ................. 297/284 |
| 4,452,485 A | 6/1984 | Schuster ....................... 297/284 |
| 4,465,317 A | 8/1984 | Schwarz ....................... 297/284 |
| 4,601,514 A | 7/1986 | Meiller ........................ 297/284 |
| 4,632,454 A | 12/1986 | Naert .......................... 297/284 |
| 4,880,271 A | 11/1989 | Graves ......................... 257/284 |
| 5,197,780 A | 3/1993 | Coughlin ..................... 297/284.7 |
| 5,217,278 A | 6/1993 | Harrison et al. ............. 297/284.7 |
| 5,335,965 A | 8/1994 | Sessini ........................ 297/284.4 |
| 5,385,531 A | 1/1995 | Jover ............................. 601/99 |
| 5,397,164 A | 3/1995 | Schuster et al. ............. 297/284.1 |
| 5,449,219 A | 9/1995 | Hay et al. ...................... 297/284.4 |
| 5,452,868 A | 9/1995 | Kanigowski .................. 244/122 R |
| 5,553,917 A | 9/1996 | Adat et al. ................... 297/230.14 |
| 5,567,011 A | 10/1996 | Sessini ........................ 297/284.7 |
| 5,609,394 A | 3/1997 | Ligon, Sr. et al. ............. 297/284.4 |
| 5,704,687 A | 1/1998 | Klingler ........................ 297/284.4 |
| 5,911,477 A | 6/1999 | Mundell et al. ................ 297/284.4 |
| 5,913,569 A | 6/1999 | Klingler ........................ 297/284.4 |
| 5,934,752 A | 8/1999 | Klingler ........................ 297/284.4 |
| 6,007,151 A | * 12/1999 | Benson |
| 6,050,641 A | * 4/2000 | Benson |
| 6,079,783 A | 6/2000 | Schuster, Sr. et al. ......... 297/284.4 |
| 6,227,617 B1 | * 5/2001 | von Moller |
| 6,227,618 B1 | 5/2001 | Ligon, Sr. et al. ............. 297/284.4 |
| 6,254,187 B1 | 7/2001 | Schuster, Sr. et al. ......... 297/284.1 |
| 6,296,308 B1 | 10/2001 | Cosentino et al. ............ 297/284.4 |

FOREIGN PATENT DOCUMENTS

| | | | |
|---|---|---|---|
| EP | 0006840 A1 | 1/1980 | |
| EP | DE2947472 A1 | 8/1980 | |
| EP | 0 169 293 B1 | 10/1988 | ............ A47C/7/46 |
| EP | 0322535 A1 | 7/1989 | |
| EP | 0 702 522 B1 | 3/1997 | ............ A47C/7/46 |
| GB | 2 013 487 | 2/1978 | ............ A47C/7/46 |
| WO | WO/00/00064 | 1/2000 | ........... A47C/3/025 |

\* cited by examiner

*Primary Examiner*—Milton Nelson, Jr.
(74) *Attorney, Agent, or Firm*—Grant D. Kang, Esq.; Robert C. Haldiman, Esq.; Husch & Eppenberger, LLC

(57) ABSTRACT

A powered lumbar support device includes a panel having a first end and a second end. The panel is biased in a forward direction for providing an arch in a seat back. A lumbar frame extends downwardly from a support element for slideably supoprting the panel. A first cable is affixed to one of the ends of the panel and to an arching rack of a first gear box. Linear movement of the arching rack transfers motion to one of the ends to change the distance between the ends by moving the first cable. The powered lumbar support device includes a second gear box having a moving rack and a moving pinion for vertically shifting the lumbar support device. The second gear box may also be used to actuate additional support features, such as a bolster.

20 Claims, 12 Drawing Sheets

POWERED ACTUATOR FOR LUMBAR UNIT

RELATED APPLICATIONS

This application is a continuation-in-part of copending application Ser. No. 09/790,003, filed Feb. 21, 2001.

BACKGROUND OF THE INVENTION

The present invention relates to a mechanical lumbar support for a seat back. More specifically, the present invention relates to a mechanical lumbar support intended for use in an automotive seat.

Consumer trends have forced automobile manufacturers to provide ever increasing levels of comfort in the products being offered for sale. This includes providing multiple seat adjustment components such as reclining mechanisms, headrest height and tilt adjusters, and variable lumbar support devices. These components are designed to meet the physical needs of various sizes of seat occupants. However, to meet these needs, these comfort components require a high level of complexity due to the number of moving parts necessary to provide support at various locations. In particular, the variable lumbar support devices presently being used have included cables and pulley devices that are threaded throughout the seat back.

The complexity of lumbar support devices of the present art consume a significant amount of packaging space and add a considerable amount of mass to the seat. One such device is disclosed in U.S. Pat. No. 5,567,011 to Sessini. Sessini discloses a lumbar support device that requires a cord be threaded through a seat back and routed with a series of pulleys for both adjusting the height and the magnitude of the lumbar support. While devices such as this fulfill comfort expectations, they are costly to produce and difficult to assemble. Further, this type of device requires that a seat back have considerable thickness to enclose all of the lumbar adjustment components.

Therefore, it would be desirable to design an adjustable lumbar support device that meets the needs of various sizes of seat occupants and yet does not adversely affect mass, cost, or packaging space of the vehicle.

SUMMARY OF THE INVENTION AND ADVANTAGES

This invention relates to a powered lumbar support device intended for use in an automobile seat back. The device includes a panel that has a first end and a second end and is biased in a forward direction for providing an arch in the seat back. A lumbar frame secures the support device to the seat back. A first gear box has an arching rack and an arching pinion is affixed to the lumbar frame. A first cable connected to one of the panel ends and to the arching rack. A first motor engages the arching pinion for moving the first cable and changing the distance between the first end and the second end. By changing the distance between the first end and the second end, the arch in the panel can be changed for adjusting the amount of lumbar support.

A complaint spring is connected to one of the ends of the panel and to the first cable. The compliant spring includes a contracting spring force that is greater than the extending force generated by the drive mechanism. Therefore, the compliant spring will prevent the control module from sliding upon the lumbar frame. However, when the panel is subjected to enough force to overcome the contracting spring force, the compliant spring stretches increasing the distance between the first end and the second end changing the arch in the panel. The compliance provided to the panel by the resilient spring provides an additional level of comfort to the seat occupant not otherwise available in a rigid lumbar support device.

The first gear box is powered by a small electric motor eliminating the need for cable and pulley devices for changing the amount and the location of the lumbar support in the seat back. Further, the first gear box is packaged into a compact lumbar support module that is easily installed into a seat back frame without having to route cables. Due to the compact nature of the module, lumbar support can be provided in seat backs that are much thinner than those currently in use. Still further, the modules are much less expensive to produce than the current cable and pulley style devices. The low cost provides the ability to install lumbar support devices into economically priced automobiles.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
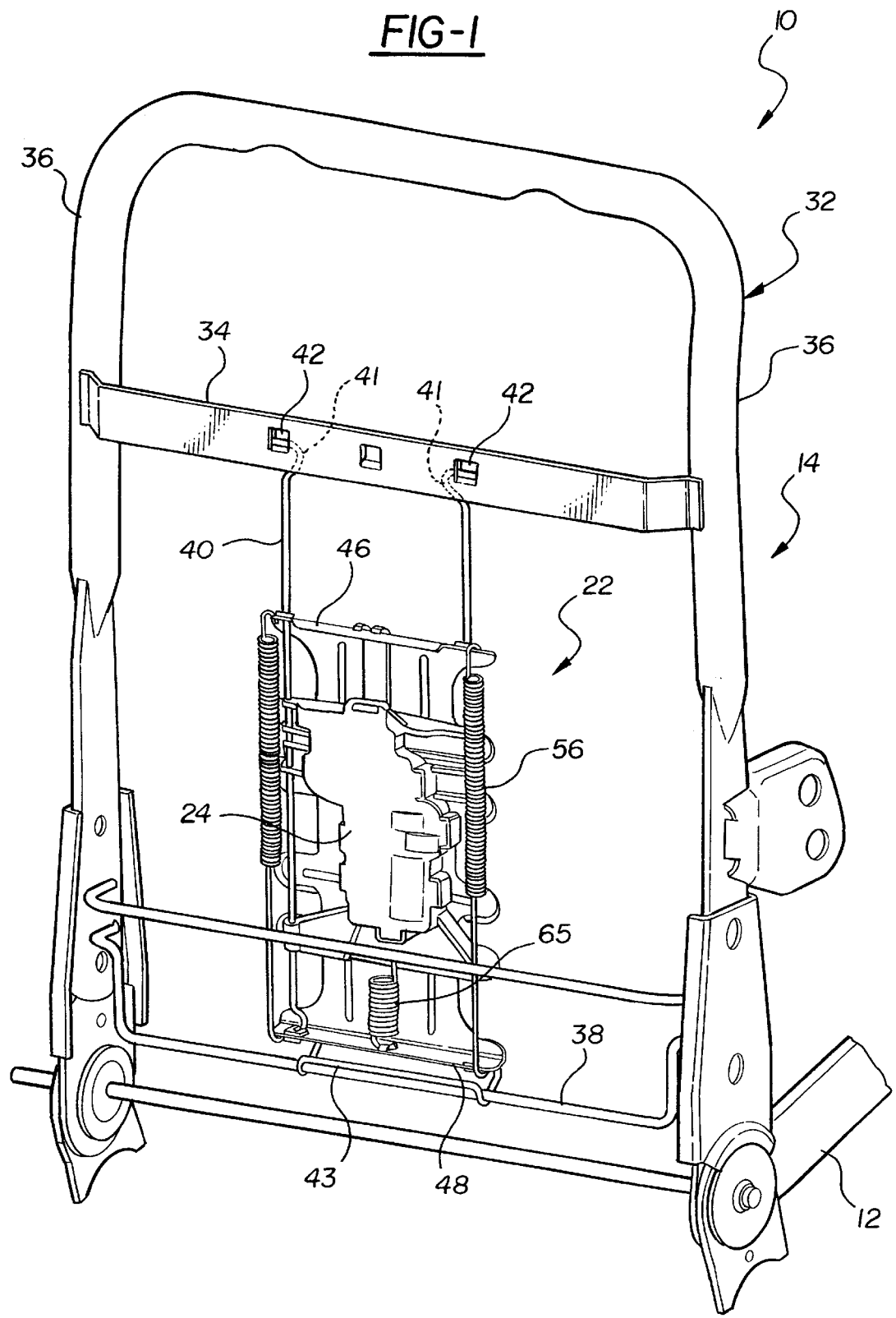
FIG. 1 is a perspective cut away view, showing a seat frame incorporating the lumbar support device with the basket in the arched position.
Figure 2:
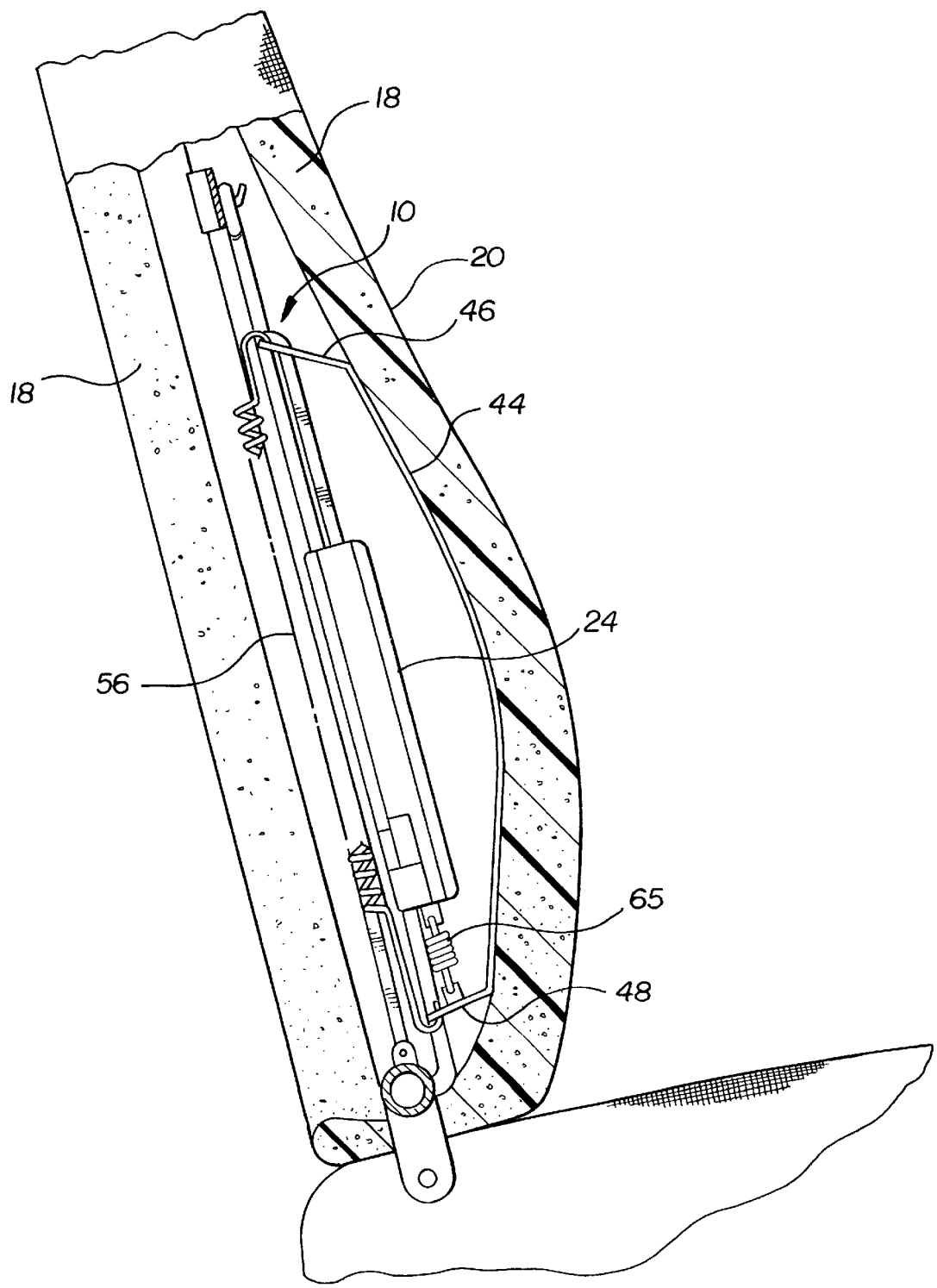
FIG. 2 is a environmental cut away side view, showing a seat with foam and padding, incorporating the lumbar support device with the control module.

Referring to the FIG. 1, an automotive seat frame is generally shown at 10. The frame 10 includes a seat section 12 and back section 14. A reclining mechanism 16 pivotally connects the seat section 12 to the back section 14 and allows the back section 14 to be adjustably fixed into any angular orientation with respect to the seat section 12. FIG. 2 shows the frame 10 concealed by a foam barrier 18 covered with fabric 20 as is known in the art of automotive seating.

A power lumbar device, generally shown in FIG. 1 at 22, provides adjustable back support in the fore/aft direction of the automobile (not shown). The lumbar device 22 includes a control module 24 that adjusts the lumbar device 22 in the fore/aft direction.

The back section 14 of the frame 10 includes a structural ring 32 that defines the perimeter of the back section 14 as is known in the art of automotive seat construction. A support element 34 extends between vertical appendages 36 of the structural ring 32. A cross member 38 also extends between the vertical appendage 36 and is positioned beneath the support element 34. A lumbar frame 40 extends downwardly from the support element 34 and affixes to the cross member 38.

The lumbar frame 40 comprises a single wire that is generally U-shaped and supports the entirety of the lumbar device 22. A pair of hooks 41 engages tabs 42 protruding from the support element 34. A clasp 43 is formed in a lower section of the lumbar frame 40 and clasps the cross member 38. The lumbar device 22 is easily delivered as a completed module and is easily installed into the sea frame 10 by simply clasping the cross member 38 with the clasp 43 and flexing the hooks 41 to engage the tabs 42.

The lumbar device 22 includes a basket comprising a resilient panel 44 arched in the fore direction. The resilient panel 44 includes an first flange 46 and a second flange 48. The first flange 46 includes a first upper notch 50 and a second upper notch 52. The lower flange 48 includes a first lower notch 50' that aligns with the first upper notch 50 and a second lower notch 52' that aligns with the second upper notch 52. The lumbar frame 40 slideably engages the upper notches 50, 52. The lumbar frame 40 includes a pair of protuberances 53 that engage the lower notches 50', 52 preventing the second flange 48 from sliding upon the lumbar frame 40. Each notch 50, 50', 52, 52' includes an insert 51 that engages the lumbar frame 40 providing reliable retention.

The resilient panel 44 includes vertically oriented ribs 54 for stiffening the panel 44. Because the panel 44 is biased in the fore direction, the control module 24 need only apply minimal amounts of force to increase the arch in the fore direction to provide increased lumbar support to the seat occupant.

Figure 3:
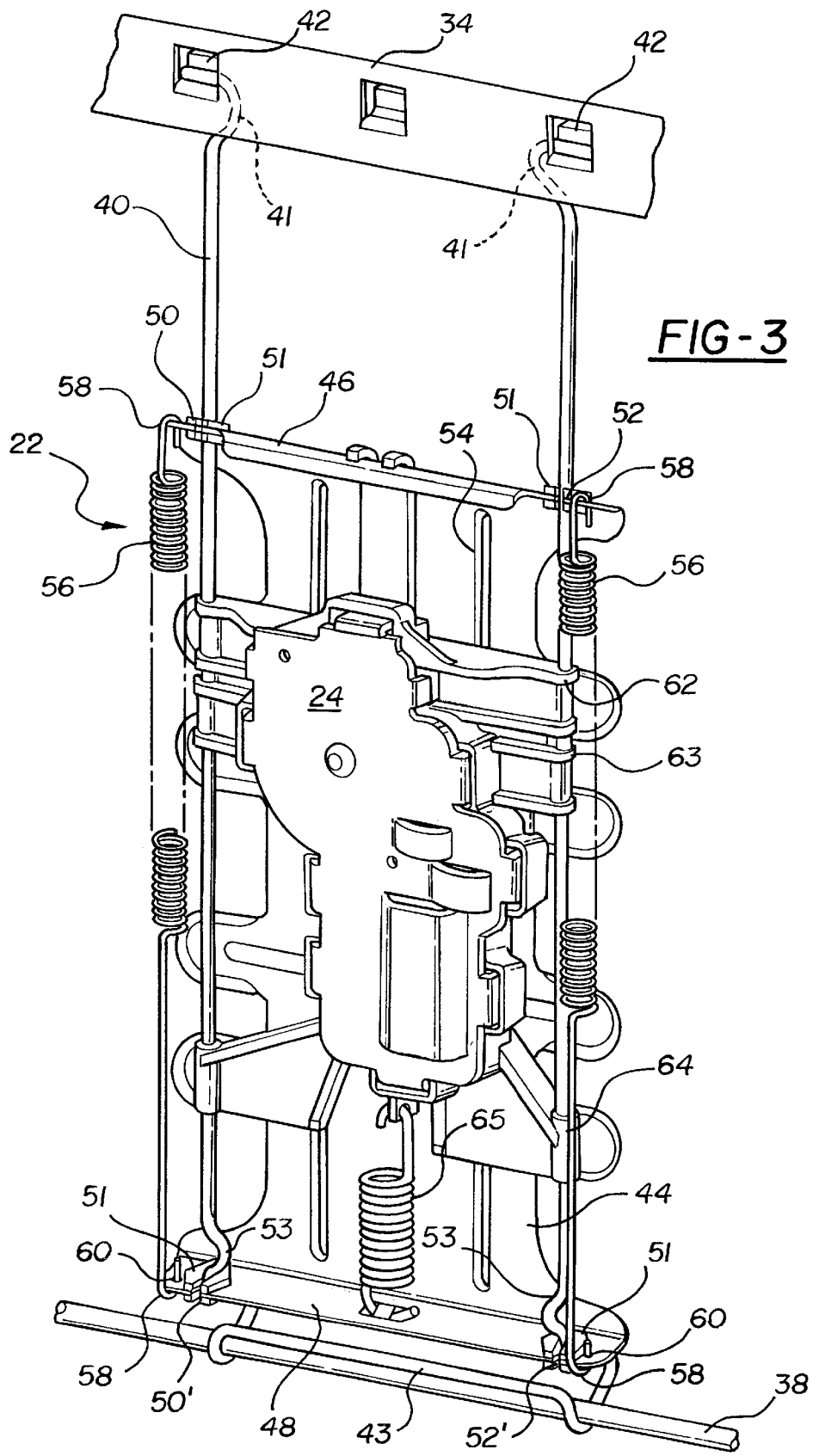
FIG. 3 is a schematic front view of the lumbar support device.
Figure 4:
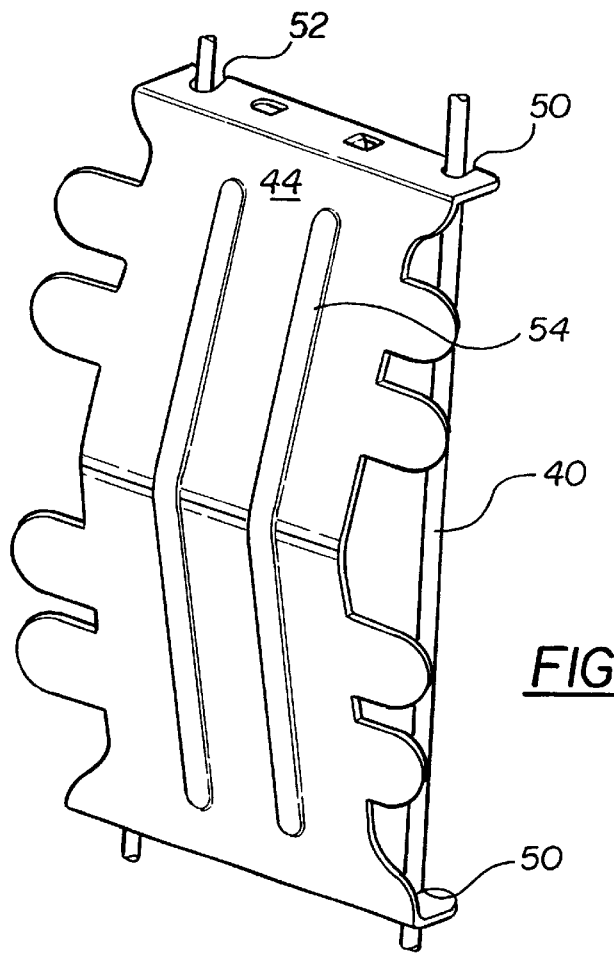
FIG. 4 is a schematic front view of a prebent basket mounted to the lumbar frame.

Compliant springs 56 are shown in FIGS. 1, 2, and 3 positioned on opposite sides of the module 24 and connect to the first and second flanges 46, 48 of the resilient panel 44. The compliant springs 56 have hooks 58 disposed at each end that engage an aperture 60 positioned at the outer ends of the upper and lower flanges 46, 48. The springs 56 provide a contracting force to the resilient panel 44 further biasing the panel. The springs 56 reduce the force required from the first control module 24 to flex the resilient panel 44 in the fore direction. The number of compliant spring connected to the resilient panel 44 can vary to meet different force requirements.

Figure 5:
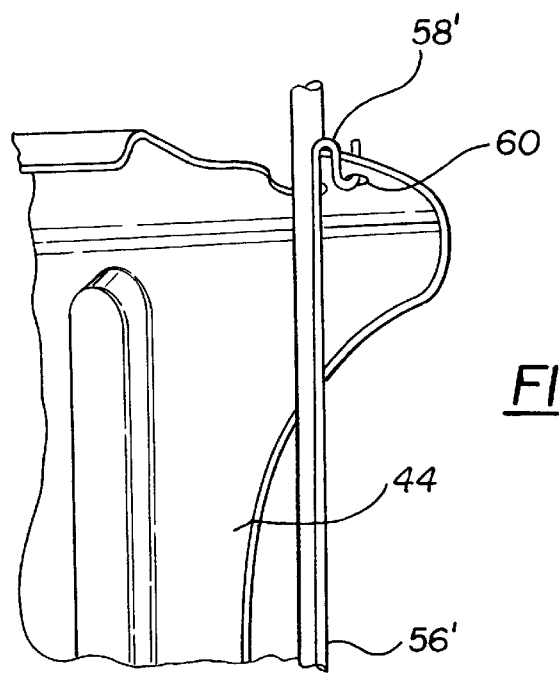
FIG. 5, is an expanded perspective view of the compression spring engaging the resilient panel.

Alternatively, as shown in FIG. 5, a compression spring 56' can be utilized to counter the biasing of the basket. In this case, the springs 56' include reverse hooks 58' disposed at each end. The reverse hooks 58' engage the apertures 60 in an opposite manner as the hooks 58 allowing the compression spring 56' to engage the resilient panel 44 in a way necessary to counter the biasing of the resilient panel 44.

As best represented in FIGS. 1 and 3, the control module 24 is slideably connected to the lumbar frame 40 by at least one backing plate 62, 63, 64. Preferably, an upper backing plate 62, a middle backing plate 63, and a lower backing plate 64 are each connected to the control module 24 and slideably engage the lumbar frame 40. However, other configurations and numbers of backing plates would be equally effective. A compliant spring 65 affixes the control module 24 to the second flange 48 preventing the control module 24 from sliding upon the lumbar frame 40 unless the contracting spring force of the compliant spring 65 is overcome as will be explained further below.

Figure 6:
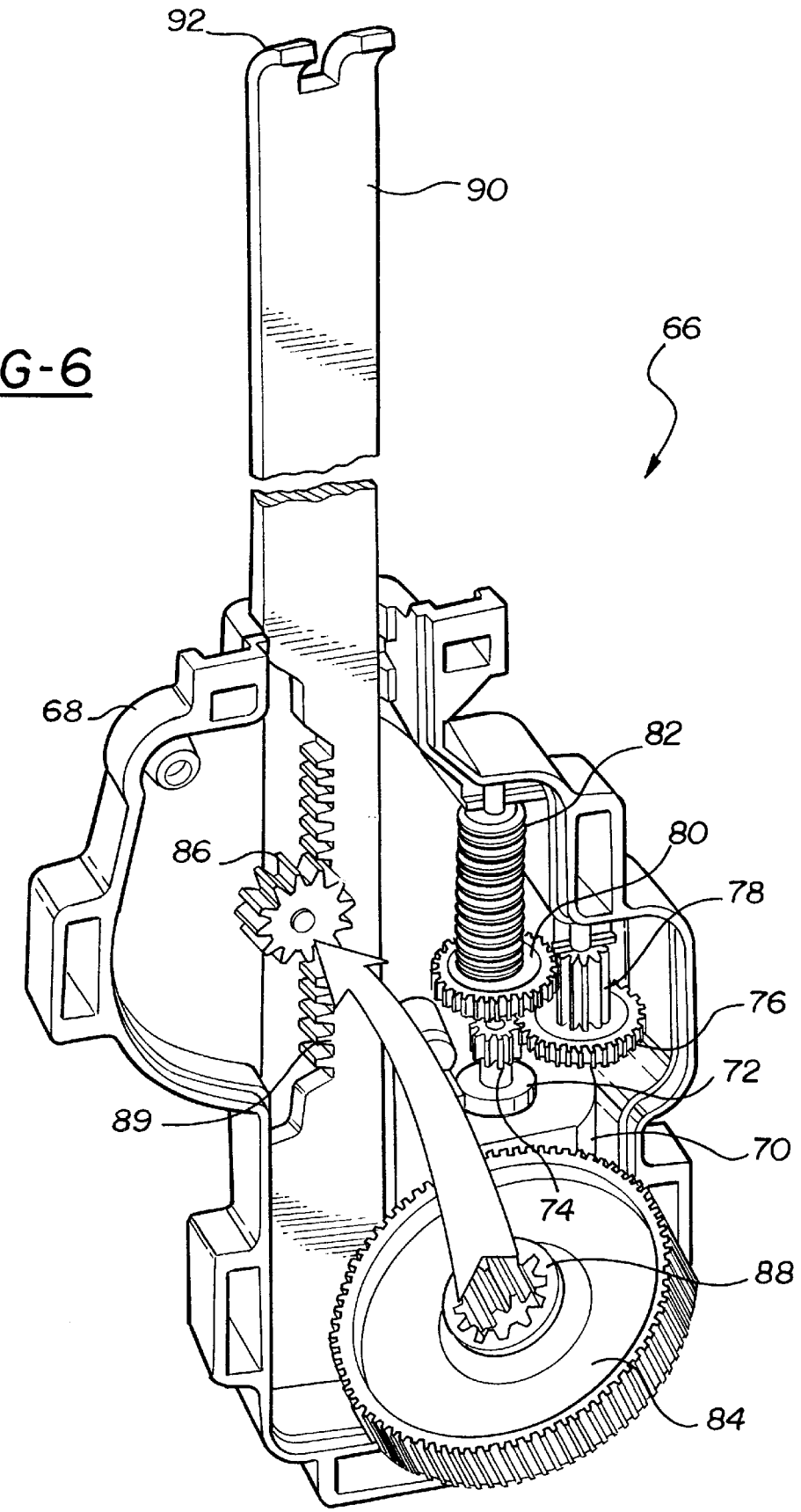
FIG. 6 is a front view of the first control module showing the electric motor and associated gears.

The module 24 includes a drive mechanism, which is shown generally at 66 in FIG. 6. The mechanism 66 includes an electric motor 70 fully enclosed in a housing 68. The motor 70 includes a drive shaft 72 having a drive gear 74 disposed at the end thereof. The drive gear 74 is in running engagement with a first spur gear 76. The first spur gear 76 is affixed to a second spur gear 78 having a narrower diameter than that of the first spur gear 76. The first and second spur gears 76, 78 are oriented to pivot upon the same axis. The second spur gear 78 is in running engagement with a third spur gear 80. The third spur gear 80 is affixed to a worm 82. The third spur gear 80 and the worm 82 are oriented to pivot upon the same axis. The worm 82 drives a worm gear 84, which in turn drives a pinion 86. The pinion 86 engages teeth 88 disposed upon the worm gear 84 that point towards the rotational axis of the worm gear 84. Therefore, the worm gear 84 and the pinion 86 are oriented to pivot on the same axis. The pinion 86 is wider than the worm gear 84 so that it can translate rotational movement from the worm gear 84 to a rack 89 by engaging the rack 89. The pinion 86 drives the rack 89 in a linear direction as is known in the art of rack and pinion drives. The motor 70 drives the rack 89 outwardly from the module 24 when running in a first direction. When the motor 70 runs in a second direction, the direction of movement of the rack 89 is reversed thereby being retracted into the module 24. The rack 89 is formed into a first extending member 90. The extending member 90 projects from the control module 24. A talon 92 engages a slot (not shown) in the first flange 46 enabling downward directing force to be applied to the first flange 46.

As indicated above, the first control module 24 is affixed to the second flange 48 of the resilient panel 44 by the compliant spring 65. By driving the first extending member 90 outward from the control module 24 the distance between the first flange 46 and the second flange 48 is increased thereby decreasing the arch of the resilient panel 44. This reduces the amount of lumbar support to the seat occupant. Retracting the extending member 90 into the control module 24 reduces the distance between the first flange 46 and the second flange 48 thereby increasing the arch in the panel 44 in the fore direction. Movement in the fore direction increases the amount of lumbar support to the seat occupant.

The force generated by the motor 70 is not capable of overcoming the contracting spring force of the compliant spring 65. However, the combination of forces generated by the spring 56 and the motor 70 provide enough counter force to the compliant spring 65 to overcome the contracting spring force of the compliant spring 65 when a predetermined force is exerted upon the resilient panel 44 by a seat occupant. This provides the panel 44 with a compliant feature that increase the level of comfort to the seat occupant by softening the lumbar support provided by the resilient panel 44.

Figure 7:
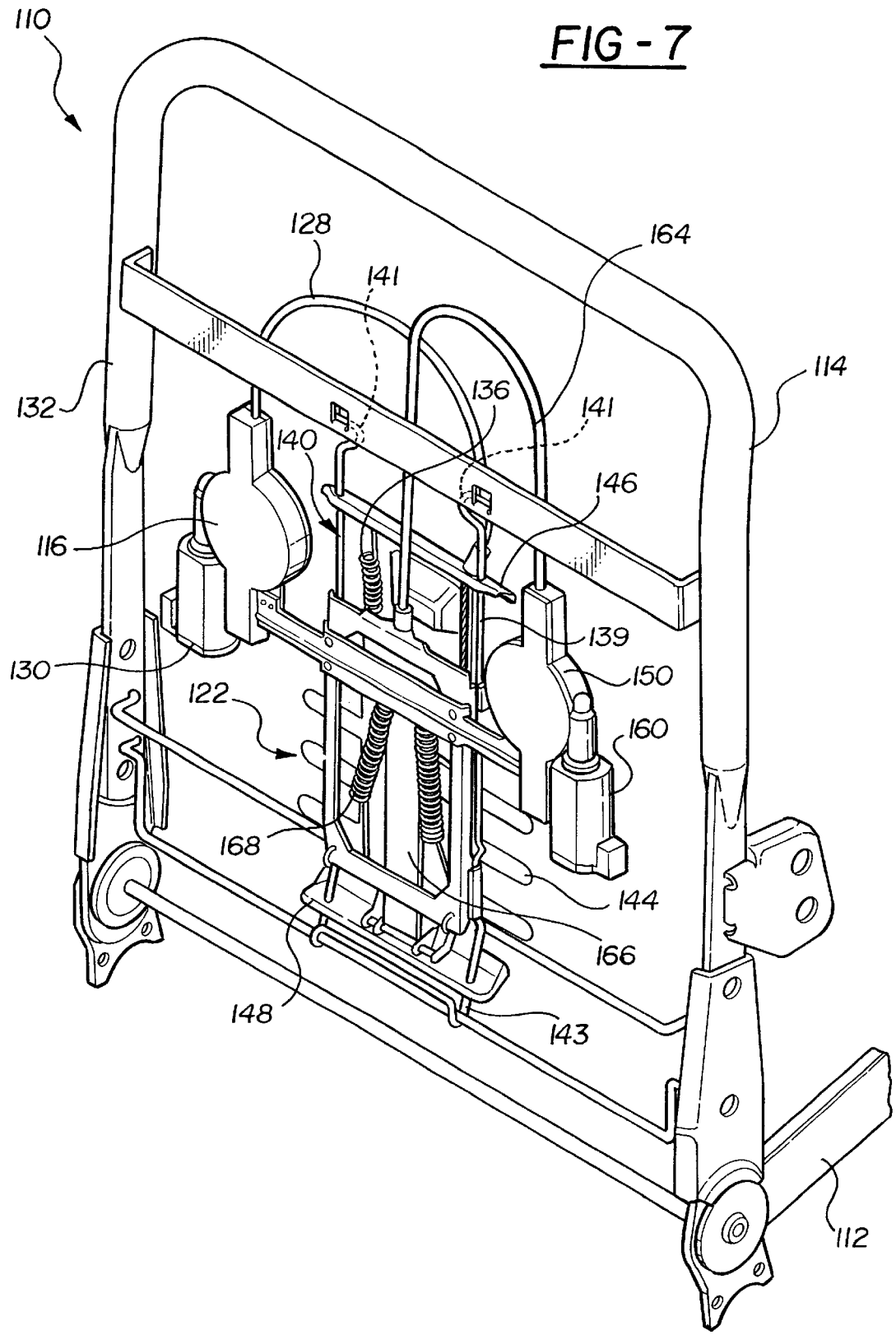
FIG. 7 is a perspective cut away view, showing a seat frame incorporating the lumbar support device with the basket in the arched position

Referring to the FIG. 7, an alternative embodiment of the automotive seat frame is generally shown at 110. The frame 110 includes a seat section 112 and back section 114. The back section 114 has a ring 132 defining the perimeter of the back section 114. A second embodiment of a powered lumbar support device 122 has a lumbar frame 140 with a plurality of hooks 141 at one end and a clasp 143 at the other. The lumbar frame 140 is fixedly attached to the ring 132 by the hooks 141 and the clasp 143. A panel 144 is slideably disposed generally upon the vertical members 139 of the lumbar frame 140. The panel 144 has a first end 146 and a second end 148 moveable relative to one another for forming an arch in the panel 144.

Figure 13:
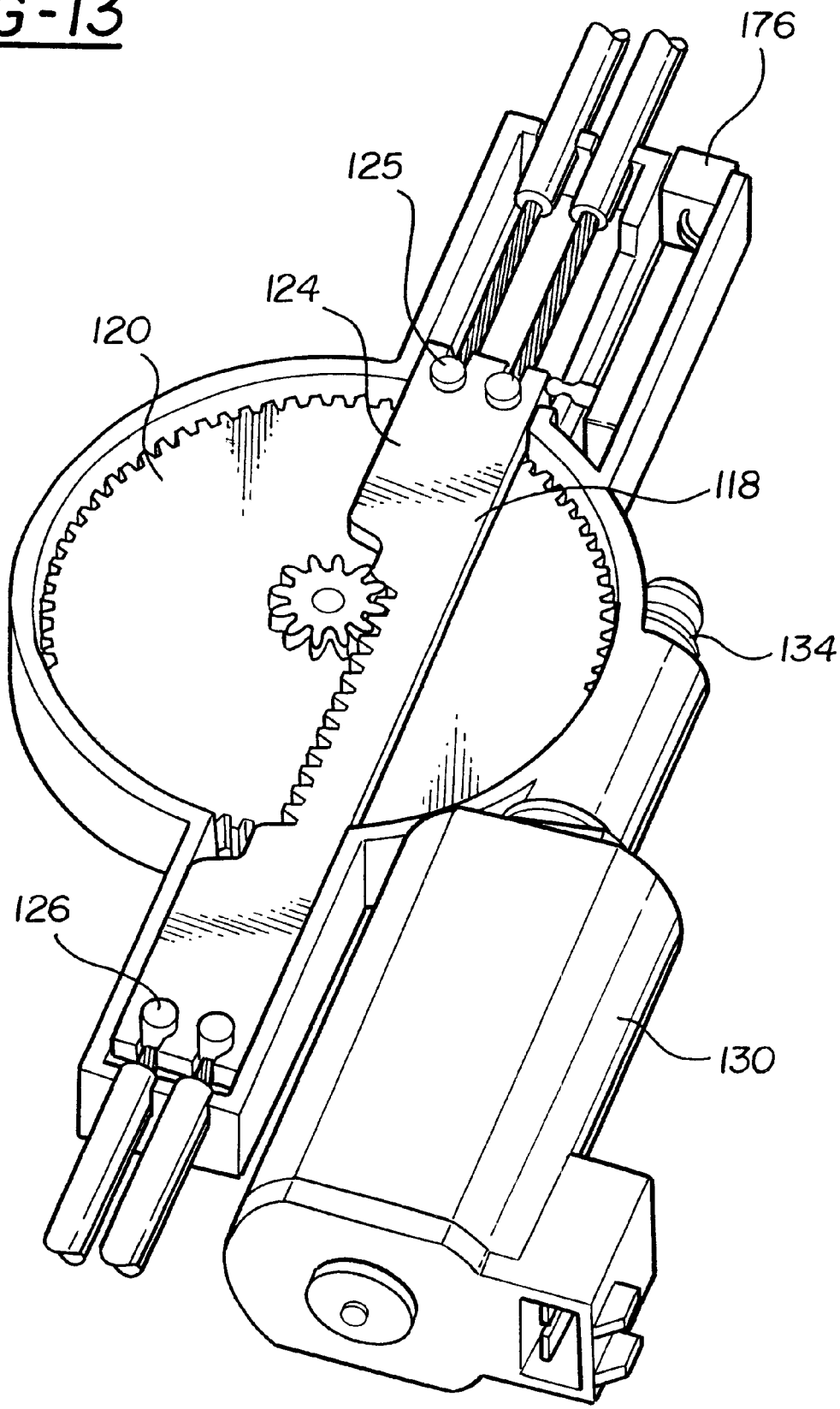
FIG. 13 is a perspective view of a gear box as used in the second, third, and fourth embodiments.

A first gear box 116, best shown in FIG. 13, is attached to the lumbar frame 140, as shown in FIGS. 7 through 11. The first gear box has an arching rack 118 and an arching pinion 120. The arching rack 118 includes a first arching end 124 and a second arching end 126. Each of the first and the second arching ends 124, 126 are adapted to allow the attachment of cables thereto. More specifically, at least one connector 125 is disposed in each of the first and second arching ends 124, 126 for receiving an end of the cable. The connector 125 is represented as a slot having a keyhole shape for receiving the end of the cable. However, the connector 125 is not limited to a slot and may include any means of fixing the cable to the rack as is known in the art. In the preferred embodiment, there are two connectors disposed in each of the arching ends 124, 126 and the connector is an aperture for receiving the end of the cable.

Figure 8:
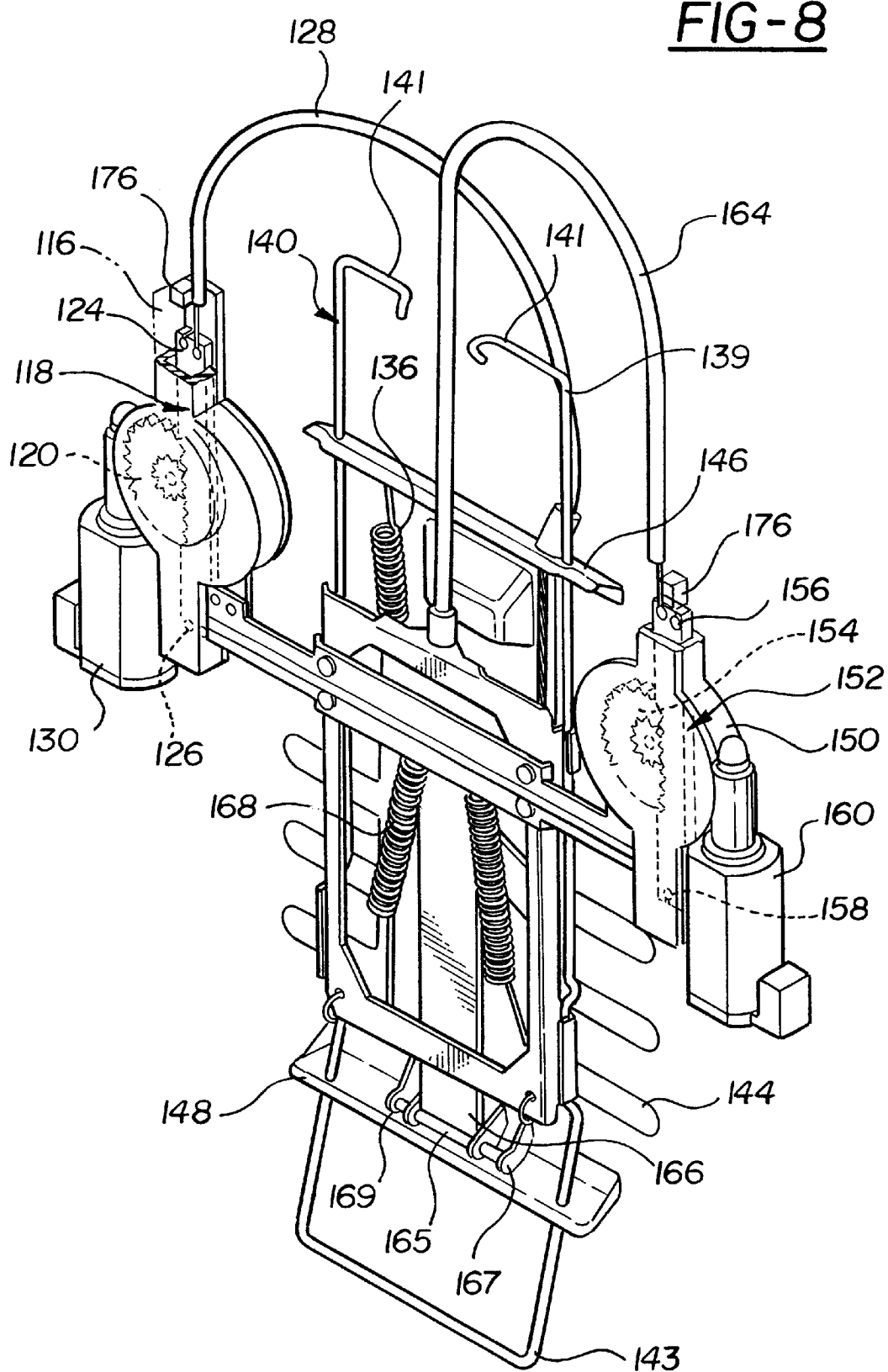
FIG. 8 is a perspective view of a second embodiment of the lumbar support device.
Figure 9:
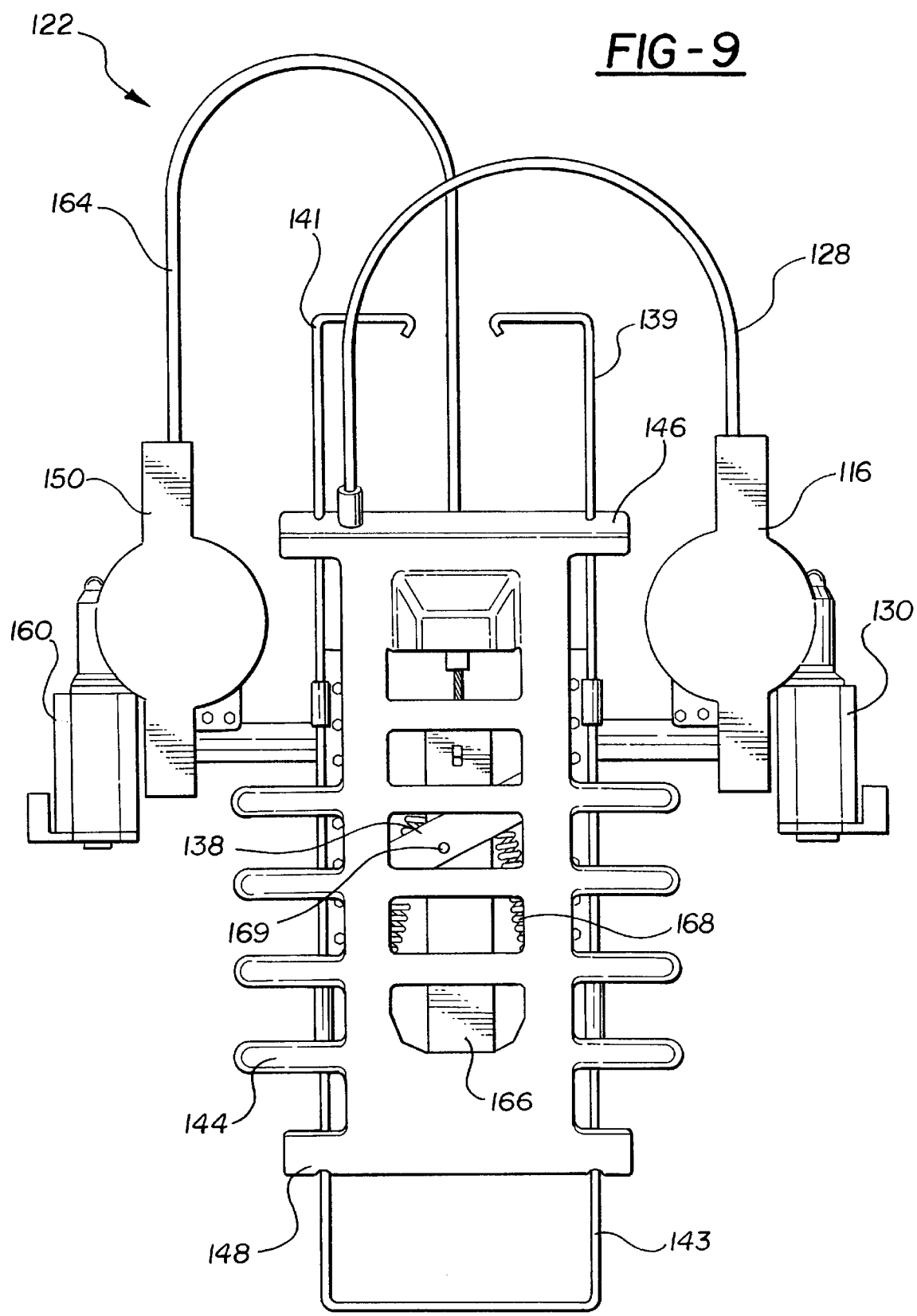
FIG. 9 is a front view of the second embodiment of the lumbar support device.

Referring to FIGS. 8 and 9, a first cable 128 is connected between the arching rack 118 and one of the ends 146, 148 of the panel 144. The arching rack 118 moves in a linear direction transferring motion through the first cable 128 to move causing the end of the panel 144. Moving of one of the ends 146, 148 of the panel 144 towards the other end 146, 148 changes the magnitude of the arch providing additional lumbar support to the seat occupant. A first motor 130 operatively engages the first gear box 116 with a worm 134 to transfer linear movement to the arching rack 118. The worm 134 is in driving engagement with the arching pinion 120 enabling the arching pinion 120 to impart linear movement to the arching rack 118. The first motor 130 is shown generally in FIG. 13 receiving cables in both ends of the rack, the purpose of which will be described below. A memory device 176 is disposed within the first gear box enabling a predetermined position of the arching rack 118 corresponding to a predetermined magnitude in the arch of the panel 144 to be stored in a controller (not shown). The memory device 176 may be any known device capable of determining the location of the rack 118 and enabling the position of the rack 118 to be stored for returning the rack 118 to that same position when desired. For example, one such device is a memory potentiometer.

Figure 11:
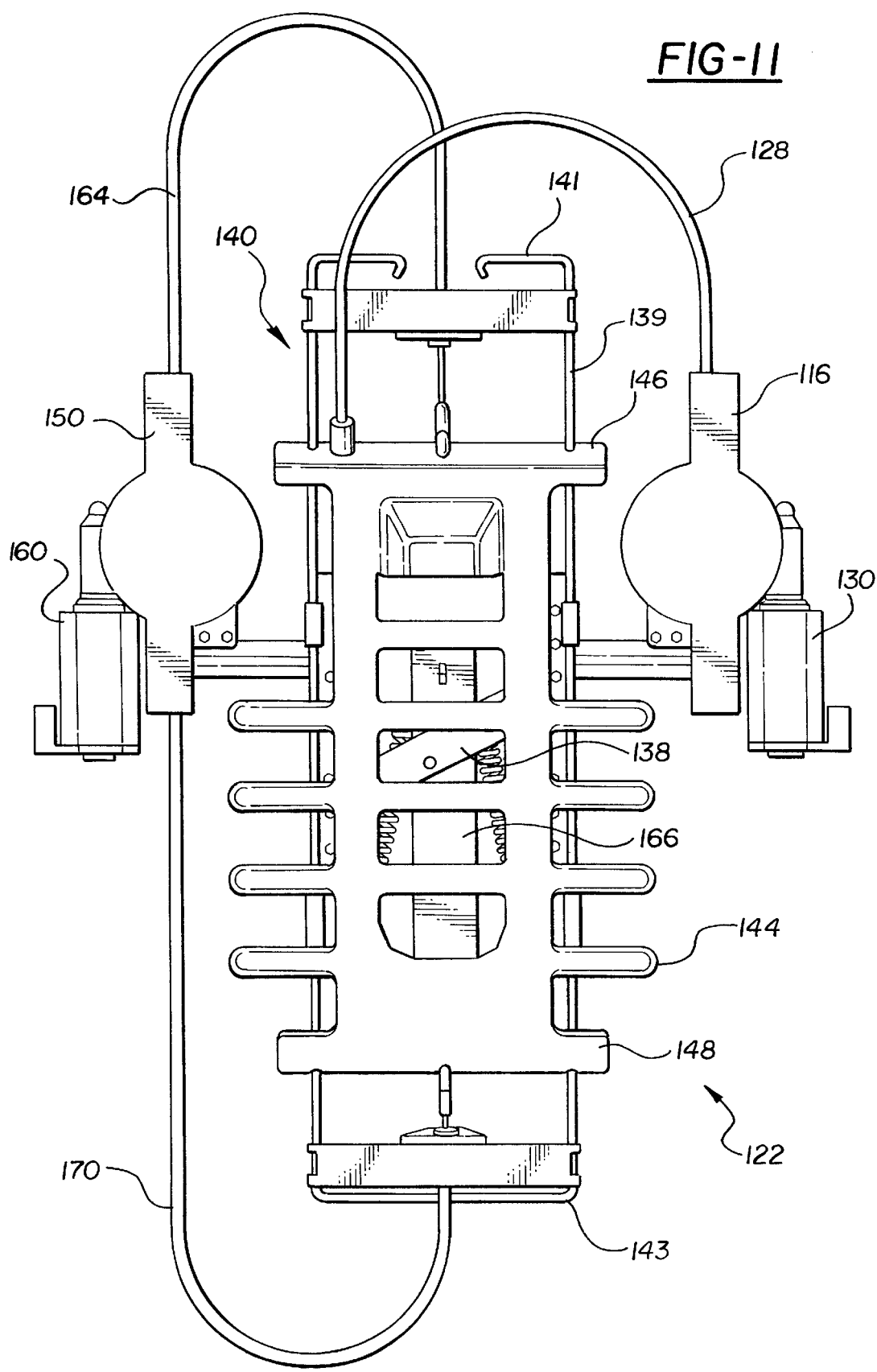
FIG. 11 is front view of the third embodiment of the lumbar support device.

The lumbar support device 122 further includes a compliant spring 136 interposed between one of the ends 146, 148 of the panel 144 and the first cable 128. The compliant spring 136 transfers movement from the first cable 128 to one of the ends 146, 148 of the panel 144. The compliant spring 136 has an expansion force stronger than the linear force generated by the first motor 130. Therefore, when the first motor 130 is operated, the ends 146, 148 of the panel 144 move without stretching the compliant spring 136. As shown in FIGS. 9 and 11, a lever 138 operably connects the first cable 128 to the compliant spring 136. A support member 166 is connected to one of the panel ends 146, 148 with a pin 165 inserted through opposing tabs 167 allowing pivotal movement of the member 166 relative to the ends 146, 148. The lever 138 is pivotally supported by the support member 166 by a pin 169 allowing pivotal movement of the lever 138 relative to the support member 166. The lever 138 is moved in response to movement of the first cable 128 thereby transferring movement from the cable through the lever 138 to one of the ends 146, 148 of the panel 144. The movement of one of the panel end 146, 148 causes the magnitude of the arch of the panel 144 to increase and decrease.

The compliant spring 136 allows the arch to flex when an outside force, such as a passenger seating in the seat, is exerted against the arch. The force generated by the first motor 130 is not capable of overcoming the contracting spring force of the compliant spring 136. However, the combination of forces generated by the spring 136 and the motor 130 provide enough counter force to the compliant spring 136 to overcome the contracting spring force of the compliant spring 136 when a predetermined force is exerted upon the panel 144 by a seat occupant. This provides the panel 144 with a compliant feature that increase the level of comfort to the seat occupant by softening the lumbar support provided by the panel 144.

Figure 10:
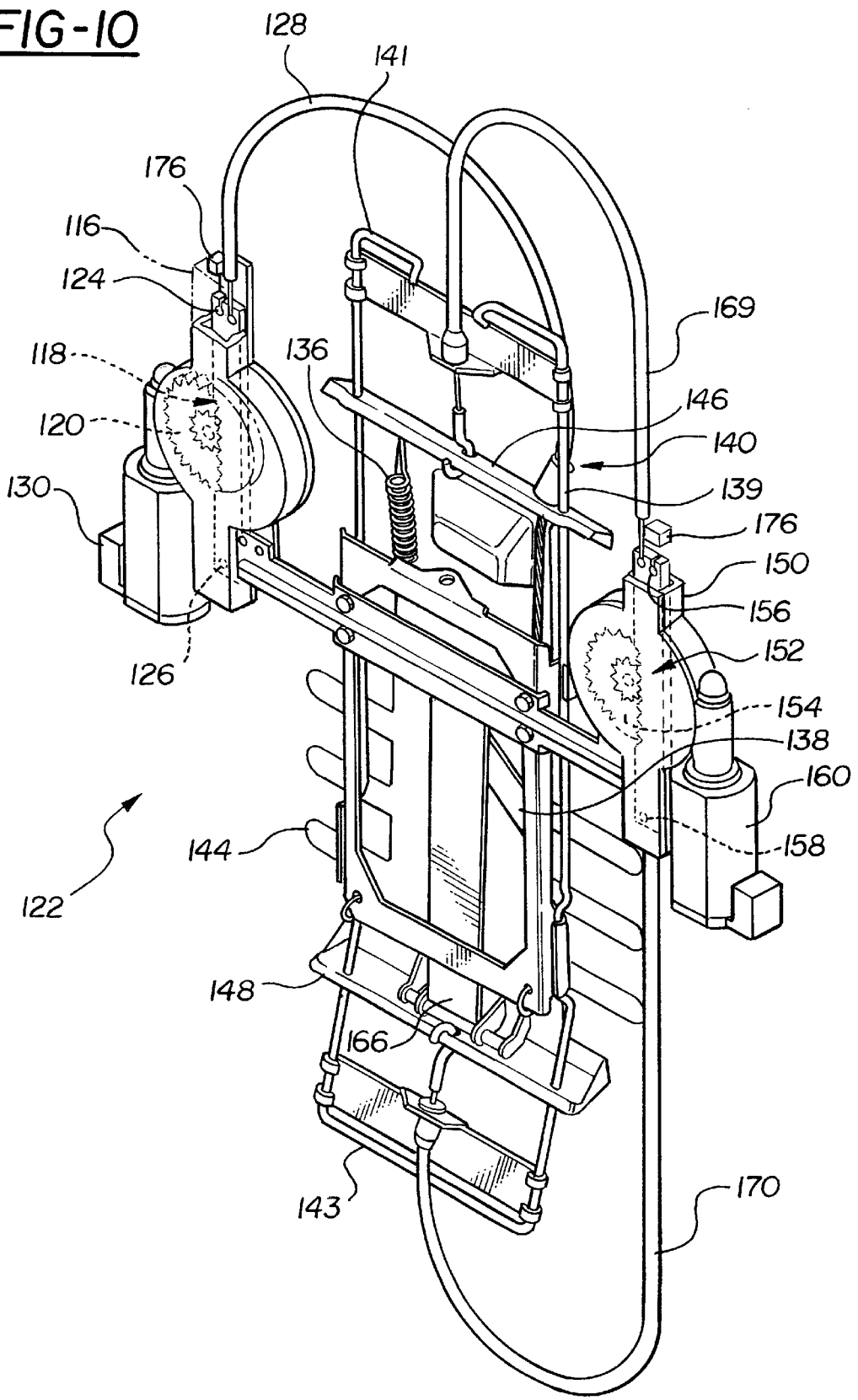
FIG. 10 is perspective view of a third embodiment of the lumbar support device.

The lumbar support device 122 may also include a second gear box 150 having a moving rack 152 and a moving pinion 154 attached to the lumbar frame 140, as shown in FIGS. 8 and 10. The moving rack 152 has a first moving end 156 and a second moving end 158 with each of the moving ends having at least one connector disposed therein. A second motor 160 having a worm 134 extending from the second motor 160 directly engages the second gear box 150. The second motor 160 and the second gear box 150 operate in the same manner as the first motor 130 and the first gear box 116. A second cable 164 is connected between one of the connectors of the moving rack 152 and the support member 166. The second cable 164 transfers linear movement of the moving rack 152 to the panel 144 for vertically shifting the panel 144. This moves the lumbar support 122 in the seat back in a generally vertical direction to accommodate various height and comfort preferences of the seat occupant.

At least one shifting spring 168 is attached between one of the ends 146, 148 of the panel 144 and the lumbar frame 140, shown in FIG. 8. When the panel 144 is shifted in a vertical direction by the second cable 164, the contraction force of the shifting spring 168 is overcome, thereby stretching the shifting spring 168. When the second motor 160 is not actually shifting the panel 144, the shifting spring 168 contracts returning the panel 144 to the original position. In the preferred embodiment, two springs are attached to the frame 110 and the panel 144, as shown in FIG. 8. However, it would be readily apparent to one skilled in the art that one spring 132 having a larger force could be used in place of the two springs.

In a third embodiment of the powered lumbar support device 122, shown in FIGS. 10 and 11, the shifting spring 168 may be replaced by a third cable 170. The third cable 170 is connected to the opposite end of the moving rack 152 than the second cable 164. Therefore, if the second cable 164 is connected to the first moving end 156 of the moving rack 152 and the third cable 170 is connected to the second moving end 158. The second and third cable 164, 170 shift the panel 144 vertically. When the rack 152 moves downward, the second cable 164 shifts the panel 144 upward. When the rack 152 moves upward, the third cable 170 shifts the panel 144 downward.

Figure 12:
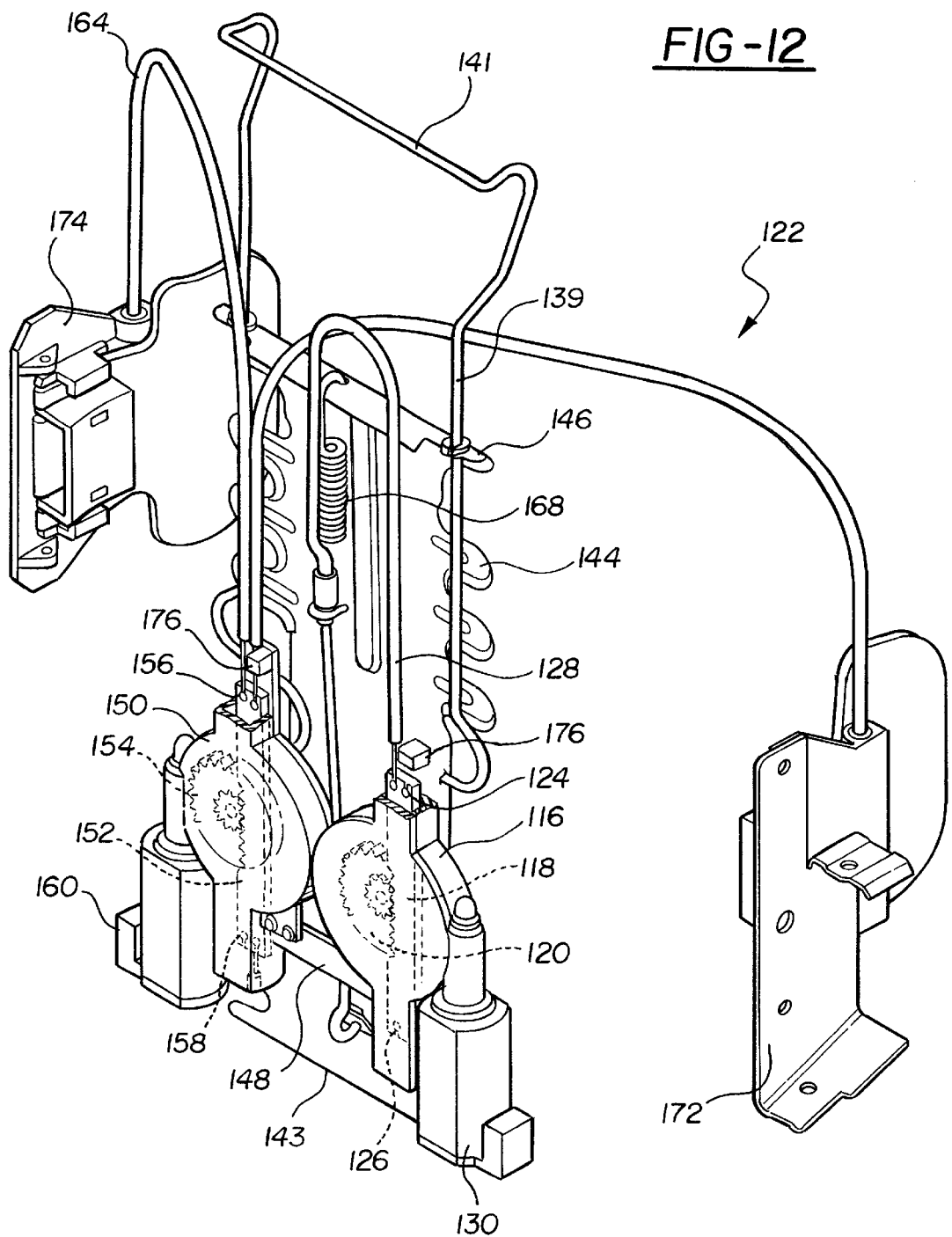
FIG. 12 is a perspective view of a fourth embodiment of the lumbar support device.

In an additional embodiment, the second gear box 150 and the second motor 160 actuate first and second bolsters 172, 174, as shown in FIG. 12. In this embodiment, the second cable 164 is connected to the first bolster 172. The second cable 164 is operably connected to one of the first and the second moving ends 156, 158 of the moving rack 152. Movement of the moving rack 152 therefore actuates the first bolster 172. The third cable 170 is connected to the same end of the moving rack 152 as the second cable 164 and actuates the second bolster 174. Therefore the moving rack 152 actuates both the first and the second bolster 172, 174 simultaneously.

The invention has been described in an illustrative manner, and it is to be understood that the terminology that has been used is intended to be in the nature of words of description rather than of limitation.

Many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A powered lumbar support device for a seat back comprising:
   a panel having a first end and a second end moveable relative to one another for forming an arch therebetween, said arch having a magnitude;
   a first gear box having a rack and a pinion for moving said panel into an arched position;
   a first cable connected to one of said first end or said second end of said panel; and
   said first cable being attached to said rack of said first gear box such that said first cable transfers linear movement from said rack to at least one of said first end or said second end of said panel such that said first end and said second end of said panel move relative to one another changing said magnitude of said arch in response to linear movement of said rack.

2. A powered lumbar support device as set forth in claim 1 including a first motor operatively engaging said first gear box for driving said rack.

3. A powered lumbar support device as set forth in claim 2 wherein said first motor further includes a worm driven by said first motor and being in driving engagement with said first gear box.

4. A powered lumbar support device as set forth in claim 3 wherein said rack further includes a first arching end and a second arching end being adapted to attach said cable thereto.

5. A powered lumbar support device as set forth in claim 4 wherein said rack further includes at least one connector disposed in each of said first and second arching ends for receiving an end of said cable.

6. A powered lumbar support device as set forth in claim 1 wherein said first gear box further includes a memory device for storing a predetermined position of said rack corresponding to said arch in said panel.

7. A powered lumbar support device as set forth in claim 1 further including a lumbar frame slideably supporting said first end and said second end thereby allowing said panel to move in a generally vertical direction.

8. A powered lumbar support device as set forth in claim 7 wherein said lumbar frame further includes opposing hooks and a clasp extending from said lumbar frame and received by the seat back thereby fixing a position of said powered lumbar support device in the seat back.

9. A powered lumbar support device as set forth in claim 1 including a compliant spring operably connected between one of said ends of said panel and said cable thereby transferring movement of said cable to one of said ends.

10. A powered lumbar support device as set forth in claim 9 including a lever pivotally linking said cable to said complaint spring whereby said cable pivots said lever transferring movement to said compliant spring.

11. A powered lumbar support device as set forth in claim 1 including a second gear box having a moving rack and a moving pinion, said moving rack having a first moving end and a second moving end, said ends having at least one connector disposed therein and adapted to receive a second cable.

12. A powered lumbar support device as set forth in claim 11 including said second cable being connected to said panel and one of said connectors of said moving rack thereby transferring linear movement of said moving racks to said panel for vertically shifting said first and said second ends of said panel.

13. A powered lumbar support device as set forth in claim 12 including a member hingedly connected to one of said ends of said panel thereby allowing pivotal movement of said member when said ends of said panel move relative to one another.

14. A powered lumbar support device as set forth in claim 12 including a shifting spring counteracting vertical movement of said panel by a second motor thereby moving said panel in an opposite direction of said second motor.

15. A powered lumbar support device as set forth in claim 12 including a third cable connected to an opposite end of said moving rack from said second cable and to the other end of said panel from said second cable enabling said moving rack to move said panel in two directions.

16. A powered lumbar support device as set forth in claim 15 wherein said moving rack transfers upward movement to downward movement of said panel and said moving rack transfers downward movement to upward movement of said panel.

17. A powered lumbar support device as set forth in claim 12 including a second motor connected to said second gear box and having a worm extending from said second motor for directly engaging said second gear box for moving said moving rack and shifting said panel.

18. A powered lumbar support device as set forth in claim 11 including said second cable being connected to a first bolster and one of said first and said second moving ends of said moving rack of said second gear box wherein movement of said moving rack actuates said first bolster.

19. A powered lumbar support device as set forth in claim 18 including a third cable being connected to a second bolster and the same one of said first and said second moving ends as said second cable for actuating said second bolster simultaneously with said first bolster.

20. A powered lumbar support device as set forth in claim 19 including a second motor connected to said second gear box and having a worm driven by said second motor for transferring movement to said second gear box thereby moving said moving rack and actuating said bolsters.

* * * * *

UNITED STATES PATENT AND TRADEMARK OFFICE
CERTIFICATE OF CORRECTION

PATENT NO. : 6,631,951 B2  
DATED : October 14, 2003  
INVENTOR(S) : Blendea et al.

It is certified that error appears in the above-identified patent and that said Letters Patent is hereby corrected as shown below:

Column 8,
Line 7, should read as follows:
-- compliant spring whereby said cable pivots said lever transferring. --

Signed and Sealed this

Third Day of February, 2004

JON W. DUDAS
*Acting Director of the United States Patent and Trademark Office*